United States Patent
Zhou et al.

(10) Patent No.: US 8,085,816 B2
(45) Date of Patent: Dec. 27, 2011

(54) REGENERATOR UNIT

(75) Inventors: Xinkuan Zhou, Eden Prairie, MN (US);
Clifton Powers, Raleigh, NC (US);
Laxman Anne, Eden Prairie, MN (US);
Manish Sharma, Eden Prairie, MN (US); Joe Polland, Eden Prairie, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 114 days.

(21) Appl. No.: 12/172,433

(22) Filed: Jul. 14, 2008

(65) Prior Publication Data
US 2009/0092176 A1 Apr. 9, 2009

Related U.S. Application Data

(60) Provisional application No. 60/978,355, filed on Oct. 8, 2007.

(51) Int. Cl.
*H04J 1/10* (2006.01)
(52) U.S. Cl. ......... 370/492; 370/254; 370/255; 370/501
(58) Field of Classification Search ........................ None
See application file for complete search history.

(56) References Cited

U.S. PATENT DOCUMENTS

| | | | | | |
|---|---|---|---|---|---|
| 3,435,416 | A | * | 3/1969 | Kretsch et al. | 340/3.51 |
| 5,187,803 | A | | 2/1993 | Sohner et al. | |
| 5,953,340 | A | * | 9/1999 | Scott et al. | 370/401 |
| 5,978,373 | A | * | 11/1999 | Hoff et al. | 370/392 |
| 6,208,670 | B1 | * | 3/2001 | Milliron et al. | 370/540 |
| 6,373,860 | B1 | | 4/2002 | O'Toole et al. | |
| 6,801,539 | B1 | * | 10/2004 | Rives | 370/466 |
| 6,891,851 | B1 | * | 5/2005 | Demakakos | 370/467 |
| 6,898,430 | B1 | * | 5/2005 | Liberti et al. | 455/445 |
| 7,061,872 | B2 | * | 6/2006 | Schumann-Olsen et al. | 370/243 |
| 2002/0146043 | A1 | * | 10/2002 | McRobert et al. | 370/537 |
| 2002/0159507 | A1 | | 10/2002 | Flaig et al. | |
| 2002/0181664 | A1 | * | 12/2002 | Yi et al. | 379/27.01 |
| 2003/0093703 | A1 | | 5/2003 | Oliver et al. | |
| 2004/0170438 | A1 | | 9/2004 | Kuribayashi | |
| 2005/0143008 | A1 | * | 6/2005 | Bailey | 455/63.1 |
| 2005/0281268 | A1 | * | 12/2005 | Akers et al. | 370/395.1 |
| 2006/0215544 | A1 | * | 9/2006 | Asa et al. | 370/216 |
| 2006/0233188 | A1 | | 10/2006 | Oliver et al. | |
| 2006/0239183 | A1 | * | 10/2006 | Robitaille et al. | 370/217 |
| 2008/0140356 | A1 | * | 6/2008 | Sanford et al. | 702/188 |
| 2009/0067451 | A1 | * | 3/2009 | Cotton et al. | 370/492 |

FOREIGN PATENT DOCUMENTS

JP 07095228 4/1995
KR 1019990057995 7/1999

OTHER PUBLICATIONS

International Searching Authority, "International Search Report", Mar. 31, 2009, Published in: WO.

* cited by examiner

*Primary Examiner* — Anthony Sol
(74) *Attorney, Agent, or Firm* — Fogg & Powers LLC (57) ABSTRACT

A communication system comprises a central unit configured to transmit and receive communication signals; a remote unit configured to transmit and receive communication signals; and a regenerator unit configured to regenerate and transmit received communication signals, the regenerator unit comprising a first interface, a second interface and a control and status circuit configured to control operation of the first and second interface, wherein each interface is configured to operate as an independent logical regenerator unit; wherein the central unit and the remote unit communicate over a first communication loop via the first independent interface of the regenerator unit.

21 Claims, 11 Drawing Sheets

| Name | Color | Operation | |
|---|---|---|---|
| Loop A LED | Red<br>Green<br>Yellow | 1. Solid Green<br>2. Solid Red<br>2. Flashing RED<br>3. Flashing Yellow | - Loop is up with no Alarms<br>- Active Alarms ( Margin/BER)<br>- Trying to Sync up<br>- Loopback active |
| Loop B LED | Red<br>Green<br>Yellow | 1. Solid Green<br>2. Solid Red<br>2. Flashing RED<br>3. Flashing Yellow | - Loop is up with no Alarms<br>- Active Alarms ( Margin/BER)<br>- Trying to Sync up<br>- Loopback active |

REGENERATOR UNIT

CROSS-REFERENCE TO RELATED CASES

This application is related to the following co-pending United States patent applications, all of which are hereby incorporated herein by reference:

U.S. provisional patent application Ser. No. 60/978,355, filed Oct. 8, 2007 entitled "TWO-SINGLE-DOUBLER MODE") which is referred to herein as the "'882 Application". The present application hereby claims priority, under 35 U.S.C. §119(e), to U.S. Provisional Patent Application No. 60/978,355; and U.S. patent application Ser. No. 11/876,330, filed on Oct. 22, 2007 entitled "Crossover Operation in a 1+1 Protection Switching Environment") and which is referred to herein as the '865 Application.

BACKGROUND

Regenerator units (also referred to as doublers or repeaters) may be used to extend the loop (also referred to as communication line) length between a central unit and a remote unit. Through the use of regenerator units, the loop length can be extended beyond the maximum length normally available between a single central unit and remote unit. In particular, regenerator units receive communication signals and regenerate or otherwise amplify the communication signals for transmission at a higher power than the power of the communication signals when received. In this way, regenerator units are able to extend the loop length. However, conventional regenerator units are typically limited to basic network topologies which can lead to increased costs for implementing regenerator units with more complex topologies.

SUMMARY

In one embodiment, a communication system is provided. The communication system comprises a central unit configured to transmit and receive communication signals; a remote unit configured to transmit and receive communication signals; and a regenerator unit configured to regenerate and transmit received communication signals, the regenerator unit comprising a first interface, a second interface and a control and status circuit configured to control operation of the first and second interface, wherein each interface is configured to operate as an independent logical regenerator unit; wherein the central unit and the remote unit communicate over a first communication loop via the first independent interface of the regenerator unit.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Figure 1:
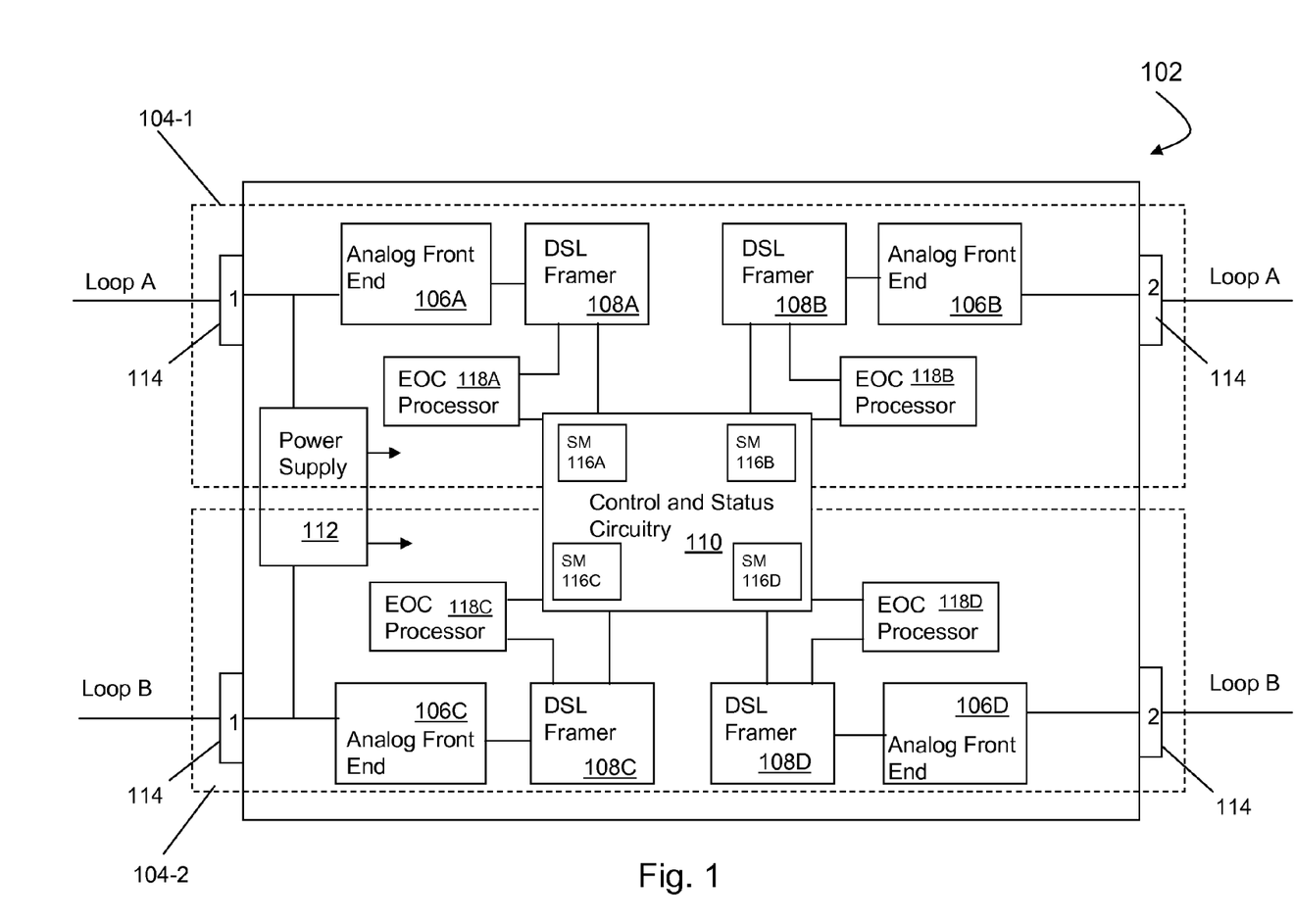
FIG. 1 is a block diagram of one embodiment a regenerator unit.

FIG. 1 is a block diagram of a regenerator unit 102 according to one embodiment of the present invention. Regenerator unit 102 may also be referred to as a doubler or repeater herein. Regenerator unit 102 includes two interfaces 104-1 and 104-2 in this example. Although two interfaces are shown in this example, it is to be understood that, in other embodiments, more than two interfaces can be included. Each interface 104-1 and 104-2 is configured to operate as an independent logical regenerator unit. In other words, although interfaces 104-1 and 104-2 physically form part of one regenerator unit, each interface 104-1 and 104-2 uses separate alarms and embedded operations channels as described in more detail below.

Each interface 104-1 and 104-2 includes two analog front ends 106. Each analog front end 106 is configured to transmit and receive communication signals via one of ports 114. In particular, each analog front end 106 converts received analog signals into digital signals for processing. In this embodiment, analog front ends 106 in each interface are configured to modulate and demodulate signals according to the Global-.standard High-Bit-Rate Digital Subscriber Line (G.SHDSL) standard.

In addition, each interface 104 includes two framers 108 one for each side of interfaces 104-1 and 104-2. Each framer 108 is configured to locate the EOC channel bytes in each received DSL frame. Each framer 108 then extracts and passes the located EOC channel bytes to a corresponding EOC processor 118. In the reverse direction, each framer 108 receives EOC bytes from the corresponding EOC processor 118 and inserts the bytes into a DSL frame for transmission over the corresponding port 114.

Each EOC processor 118 performs byte stuffing and CRC checks on EOC channel bytes. Each EOC processor 118 also identifies the type of EOC message for received EOC bytes and passes the message type information to a corresponding state machine 116 in control and status circuitry 110. Control and status circuitry 110 includes a state machine 116 for each loop and each side. In the exemplary embodiment shown in FIG. 1, control and status circuitry 110 includes four state machines 116A-116D. Each state machine is associated with an independent bidirectional EOC channel. Regenerator unit 102 is constantly monitoring the status of all four EOC state machines. State machines 116 are described in more detail with respect to the state diagram shown in FIG. 11.

Control and status circuitry 110 is configured to process data received from framers 108. For example, control and status circuitry 110 is responsible for monitoring defects, declaring alarms, and clearing alarms separately for each interface 104-1 and 104-2 based on data received from framers 108. Thus, alarms, status requests and responses are independent for each loop.

Furthermore, regenerator unit 102 has four logical device addresses, in this embodiment, one for each loop and side. One device address is associated with the central unit side of loop A. Another device address is associated with the central unit side of loop B. Another device address is associated with the remote unit side of loop A and the final device address in this embodiment is associated with the remote unit side of loop B. Messages with a broadcast address are accepted and forwarded by each interface of regenerator unit 102. Messages with the correct device address for the loop and side where received (e.g. messages received on the central unit side of loop A with a destination address which matches the address for the central unit side of loop A) are accepted and processed but not forwarded. Messages with a valid address for the regenerator unit but received on the wrong loop are not accepted or forwarded. For example, a message with the device address for the central unit side of loop B which is received on the central unit side of loop A is not accepted or forwarded.

For example, the alarms for each loop include, but are not limited to, signal-to-noise ratio (SNR) margin, loop attenuation, errored second, Loss Of Sync Word (LOSW), and direct current (DC) continuity fault. DC continuity fault indicates a remote power feed problem (e.g. short or open circuit). An LOSW failure is identified, in some embodiments, for a given loop after 2.5±0.5 s of contiguous LOSW defect. LOSW is detected on port 1 loop A, port 1 Loop B, port 2 loop A, and port 2 Loop B. SNR margin indicates a margin below threshold setting. Loop attenuation indicates loop attenuation reaches a higher value than a configured threshold.

Power supply circuit 112 is line fed over one of interfaces 104-1 and 104-2 from either a remote unit or a central unit. Power supply 112 then supplies the appropriate voltage levels to each circuit in regenerator unit 102.

Figure 2:
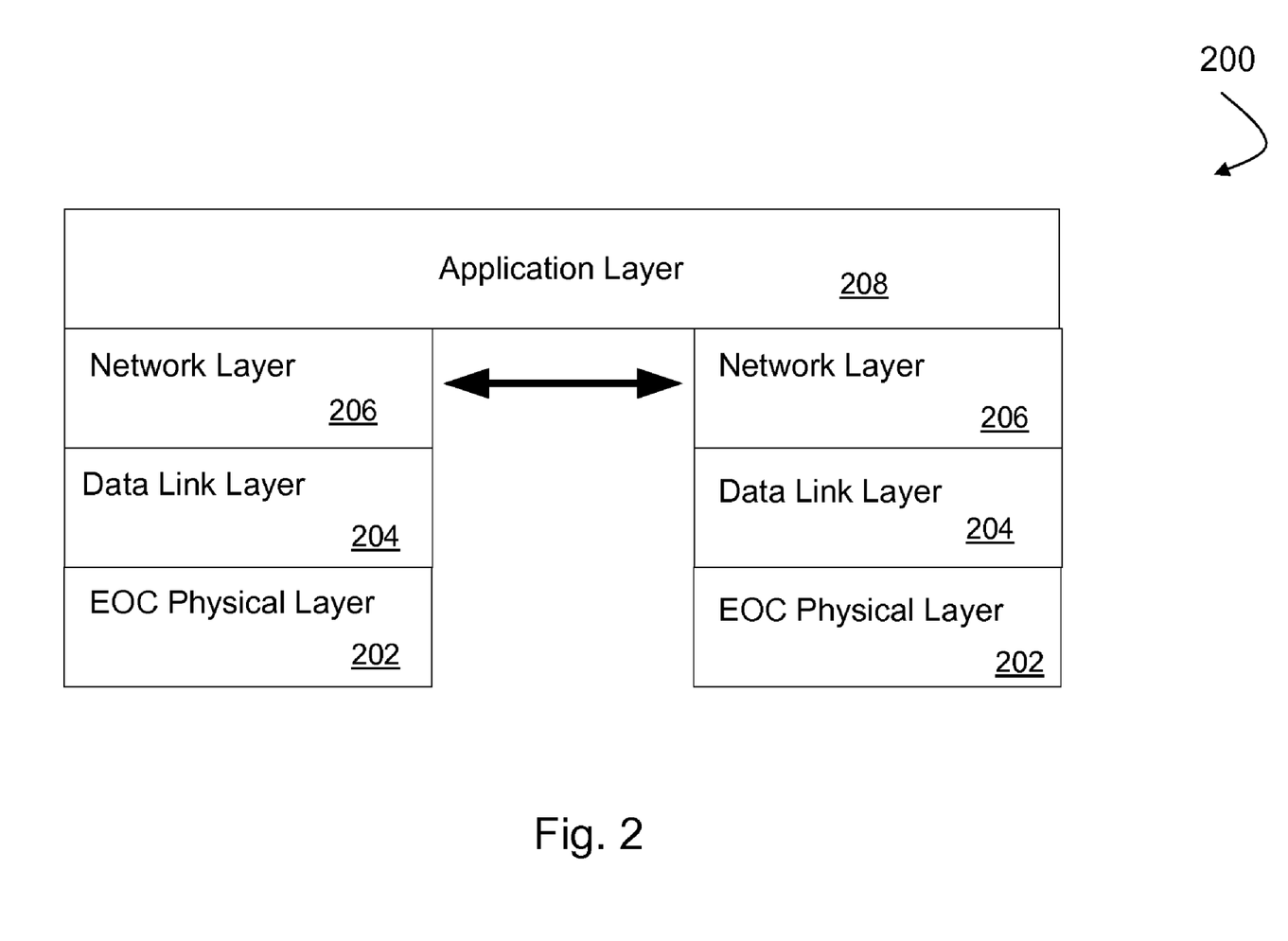
FIG. 2 is a block diagram of an embedded operations channel protocol stack.

Regenerator unit 102 communicates with a central unit and a remote unit via embedded operations channel (EOC) messages sent over EOC channels. In this embodiment, there are four physical layer EOC channels available, providing a single logical EOC channel per loop (e.g. loop A and loop B). FIG. 2 is a block diagram depicting an EOC protocol stack 200 for communication between ports 1 and 2 of each interface 104. As can be seen, the EOC protocol stack 200 consists of a physical layer 202, data link layer 204, network layer 206, and application layer 208. The application layer 208 communicates with both ports 1 and 2 of an interface 104 to complete a logical EOC channel for the interface 104.

Figure 3:
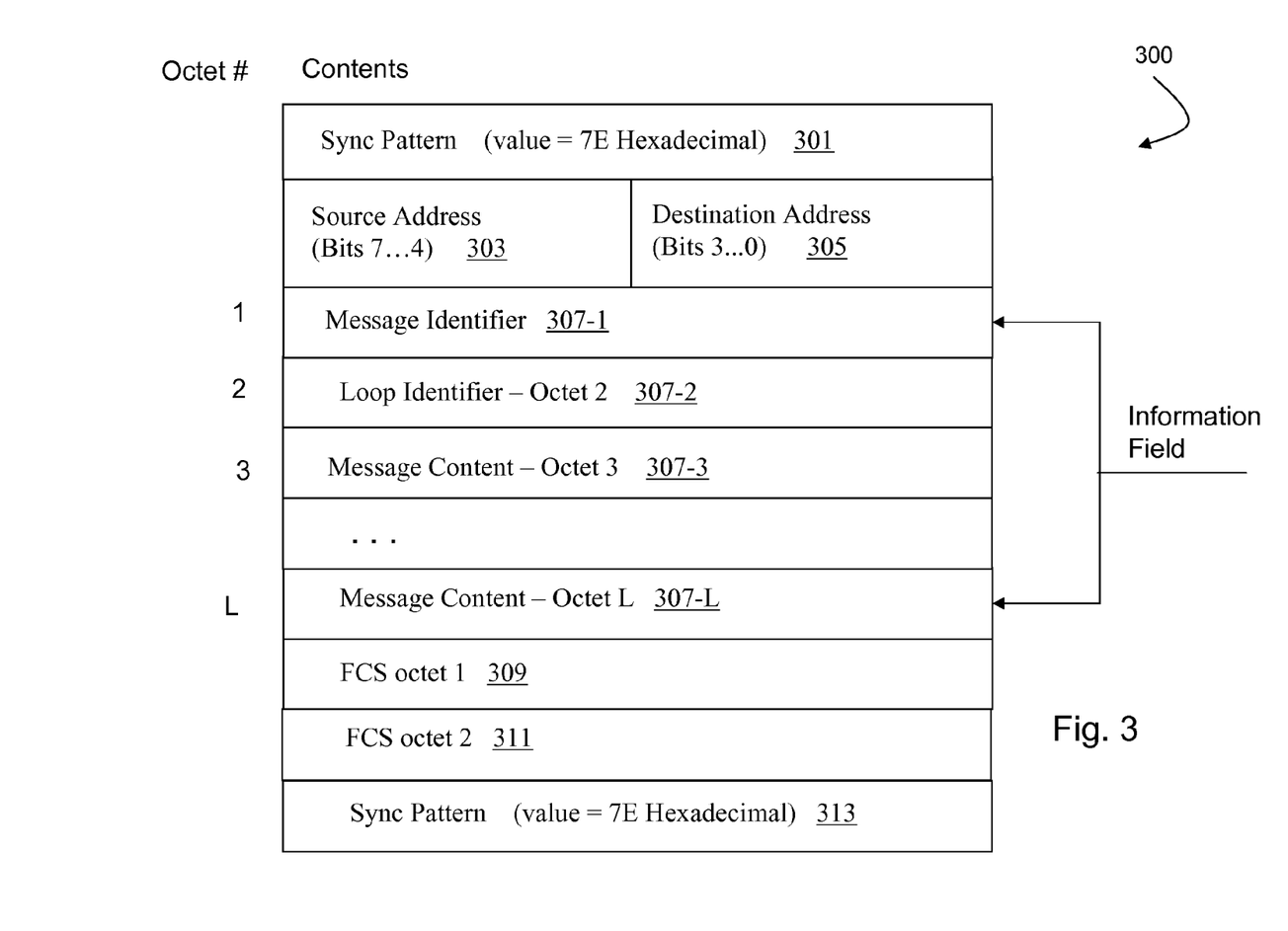
FIG. 3 is a block diagram depicting one embodiment of an embedded operations channel message format.

An exemplary EOC message format 300 used in some embodiments is shown in FIG. 3. The exemplary EOC message format 300 is similar to the format defined in the ITU G.991.2 (G.SHDSL) standard. However, in the exemplary embodiment shown in FIG. 3, EOC message format 300 is modified to include a source loop identifier field 307-2. Source loop identifier field 307-2 is used to identify cross-connects as described in co-pending U.S. patent application Ser. No. 11/876,330, entitled "Crossover Operation in a 1+1 Protection Switching Environment") which is incorporated herein by reference. Although, source loop identifier field 307-2 is included in this embodiment, it is to be understood that in other embodiments, source loop identifier field 307-2 is not used.

EOC message format 300 comprises fields 301 through 313 and is packed as an integral number of octets. Fields 301 and 313 are each a sync pattern comprised of the hexadecimal value 7E. Sync patterns separate EOC frames and indicate the start of an EOC frame. Field 303 is the source address field and field 305 is the destination address field. Fields 303 and 305 are packed into a single octet to minimize frame size. In particular, field 303 occupies bits 7 to 4 and field 305 occupies bits 3 to 0. Field 305 indicates the communication unit for which EOC message 300 is intended and field 303 indicates the communication unit from which the message is being sent. Permitted values for fields 303 and 305 include STU-C, STU-R, and a regenerator unit 1 through 8.

Fields 307-1 through 307-L comprise the information field of EOC message 300, where L is the total number of octets in the information field. In particular, field 307-1 identifies the type of message being sent. Exemplary EOC message types include discovery probes/responses, inventory requests/responses, etc. Fields 307-3 through 307-L contain the message content. Fields 309 and 311 are frame check sequence fields used for error detection and correction.

EOC message format 300 has been modified to include source loop identifier field 307-2 which identifies the loop (loop A or loop B) on which the message is sent. Source loop identifier field 307-2 offsets all following fields by one byte when compared to a conventional EOC message according to the G.SHDSL standard. All EOC messages being forwarded by regenerator unit 102 are forwarded without modification of the source loop identifier field 307-2, preserving the original source loop identifier. All EOC messages being originated by regenerator unit 102 are assigned the source loop identifier of the corresponding interface 104 via which the EOC message is sent. The source loop identifier field 307-2 helps the regenerator unit 102 identify crossover connections as described in co-pending U.S. patent application Ser. No. 11/876,330.

Source address field 303 is used to enable a central unit to automatically discover the topology of the network. In particular, regenerator unit 102, in this exemplary embodiment, has one operational mode as two independent single loops and has no concept of other application modes that are available on a central unit. When regenerator unit 102 sends an EOC discovery response to the central unit, it inserts its address as the source of the discovery response. Additional downstream units, such as remote units and other regenerator units, also insert their respective address in the source address field 303 of discovery responses sent to the central unit. Thus, the central unit is able to identify the topology for each loop.

Figure 4:
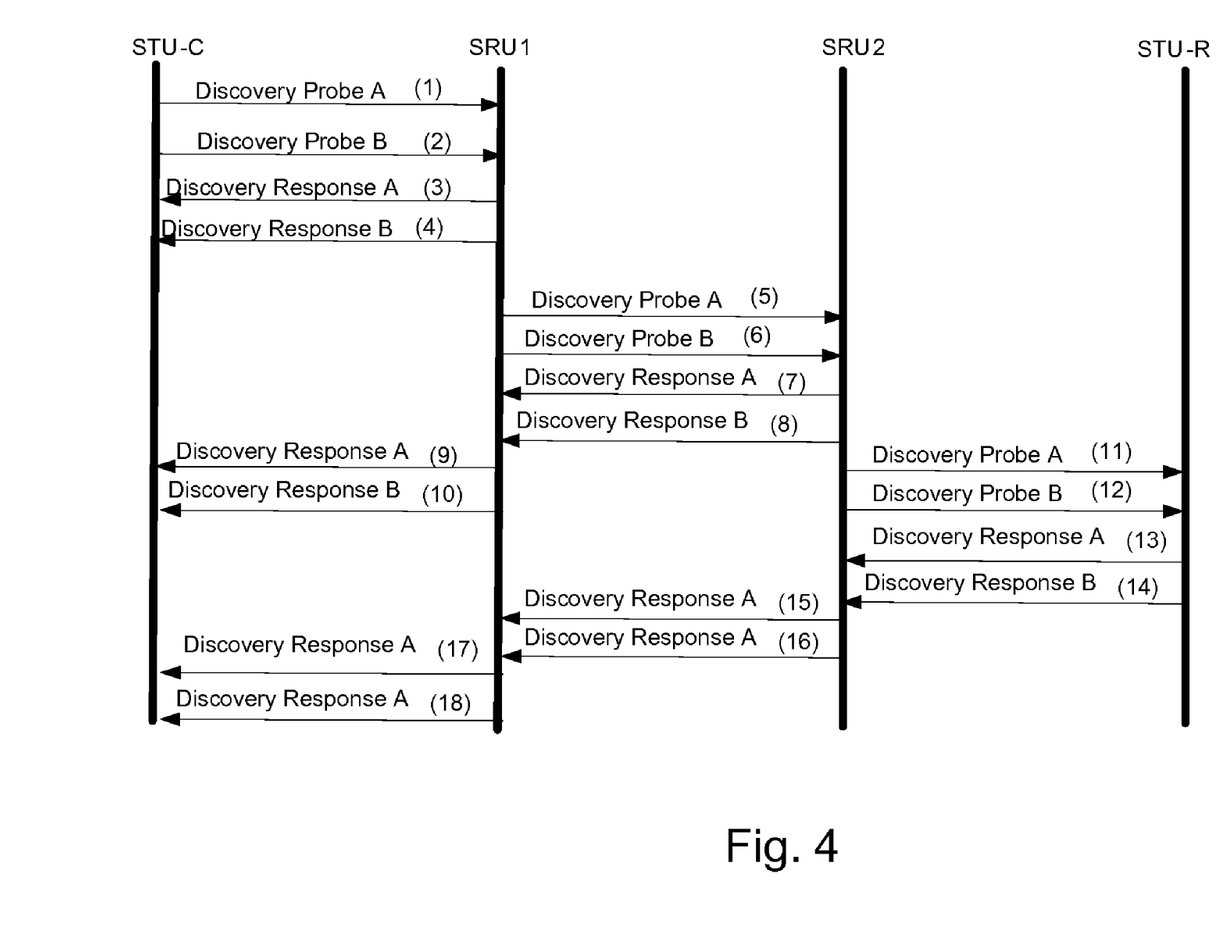
FIG. 4 is a message sequence diagram that depicts an examplary auto-discovery sequence handled by one embodiment of a communication system.

An exemplary EOC message exchange is depicted in the message sequence diagram of FIG. 4. In FIG. 4, time progress vertically from top to bottom. In addition, although FIG. 4 represents a message sequence for discovery probes sent from a central unit, it is to be understood that a similar message sequence is followed for discovery probes sent independently from remote units.

Arrows 1 and 2 in FIG. 4, represent two separate discovery probes sent from a central unit (labeled as STU-C), one discovery probe for each of loops A and B. Each discovery probe contains a source loop identifier field, source address, and destination address. A first regenerator unit (labeled as SRU1) receives each discovery probe and sends two discovery responses represented by arrows 3 and 4, one for each of loops A and B. The source address of each discovery response from SRU1 identifies that the response is from SRU1.

In addition, SRU1 forwards each received discovery probe, represented by arrows 5 and 6, to its nearest neighbor which is a second regenerator unit (labeled as SRU2) in this example. SRU2 transmits a discovery response to SRU1 for each loop, represented by arrows 7 and 8, with the source address identifying SRU2. SRU1 forwards the discovery responses from SRU2 to STU-C unmodified as represented by arrows 9 and 10. SRU2 also forwards the discovery probes to its nearest neighbor on each loop, as represented by arrows 11 and 12. The nearest neighbor of SRU2 is a remote unit (labeled as STU-R). STU-R sends a discovery response on each loop, represented by arrows 13 and 14, with the source address indicating STU-R, as described above. SRU2 forwards the discovery responses from STU-R unmodified to SRU1, as represented by arrows 15 and 16. SRU1 then forwards the discovery responses from STU-R to STU-C unmodified, as represented by arrows 17 and 18.

STU-C then evaluates the source address of each received discovery response on each physical port to detect the topology separately for each loop. In particular, in this embodiment, STU-C automatically determines, through analysis of each discovery response, that STU-C is coupled to STU-R on both loops via SRU1 and SRU2. Using this method, other topologies can be auto-discovered as well. For example, in the message sequence diagram of FIG. 5, two central units (labeled as STU-C1 and STU-C2) are coupled to two remote units (labeled as STU-R1 and STU-R2) via two regenerator units (labeled as SRU1 and SRU2). Each of STU-C1 and STU-C2 sends a discovery probe, represented by arrows 1 and 2, respectively, to SRU1.

Figure 5:
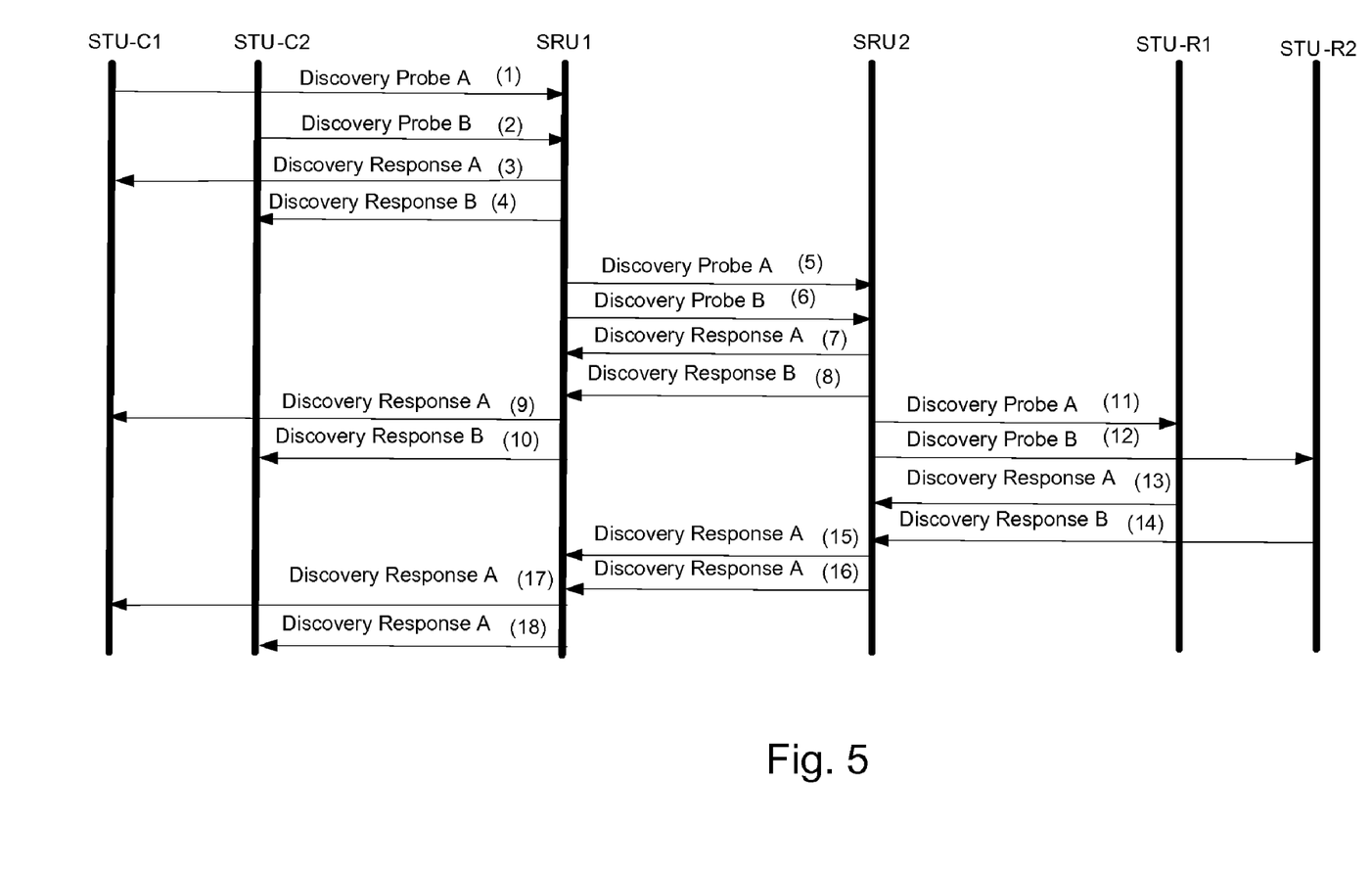
FIG. 5 is a message sequence diagram that depicts an examplary auto-discovery sequence handled by another embodiment of a communication system.

In particular, STU-C1 sends a discovery probe to SRU1 on loop A and STU-C2 sends a discovery probe to SRU1 on loop B. Since each interface of SRU1 operates independently, SRU1 is able to independently process the discovery probes from the separate central units STU-C1 and STU-C2 and send separate discovery responses to STU-C1 and STU-C2, represented by arrows 3 and 4. Similarly, SRU2 is able to independently process and respond to the discovery probes forwarded from STU-C1 and STU-C2 by SRU1 (represented by arrows 5 and 6). The discovery responses from SRU2 are represented by arrows 7 and 8. SRU1 then forwards the discovery responses from SRU2 to each of STU-C1 and STU-C2, represented by arrows 9 and 10.

In FIG. 5, loop A ends at a first remote unit (labeled STU-R1) and loop B ends at a second remote unit (labeled STU-R2). Hence, SRU2 forwards the discovery probes to STU-R1 and STU-R2, represented by arrows 11 and 12. Each of STU-R1 and STU-R2 responds to the discovery probes, represented by arrows 13 and 14. The discovery responses are forwarded by SRU2, represented by arrows 15 and 16, and by SRU1, represented by arrows 17 and 18, until the responses are received by STU-C1 and STU-C2, respectively. Each of STU-R1, STU-R2, SRU1 and SRU2 send and forward discovery responses as described above in message sequence of FIG. 4 such that each of STU-C1 and STU-C2 is able to automatically determine the topology of loops A and B, respectively.

Figure 6A:
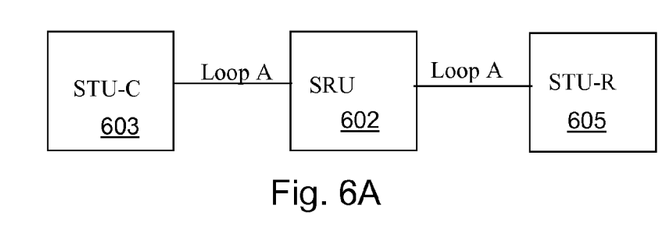
FIGS. 6A-6F are block diagrams depicting exemplary embodiments of system topologies.
Figure 6B:
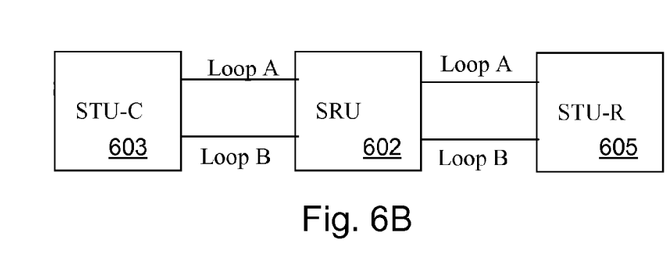
Figure 6C:
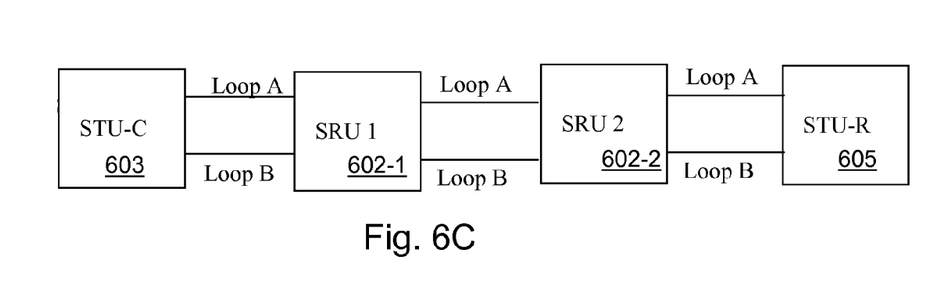

Exemplary topologies supported by some embodiments of regenerator units are shown in FIGS. 6A-6F. In particular, FIG. 6A is a block diagram of a topology having a single regenerator unit 602 and a single loop or pair (loop A). FIG. 6B is a block diagram of a topology having a single regenerator unit and two loops or pairs (loops A and B). Similarly, FIG. 6C is a block diagram of a topology having two regenerator units 602-1 and 602-2 with two loops (loops A and B).

Although, the topologies in FIGS. 6A-6C are supported by conventional regenerator units, regenerator units 602 process communication signals differently from conventional units. In particular, as stated above, regenerator units 602 have no concept of application modes since each interface in regenerator unit2 602 is configured to operate independently. For example, in FIG. 6B, regenerator unit 602 monitors status and set alarms separately for each of loops A and B. Similarly, regenerator unit 602 processes EOC messages separately for each loop. The independent operation of each interface also enables topologies not supported by conventional regenerator units, such as the topologies shown in FIGS. 6D-6F.

Figure 6D:
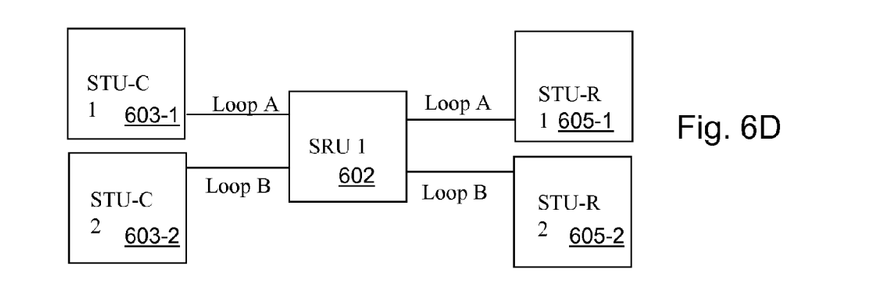
Figure 6E:
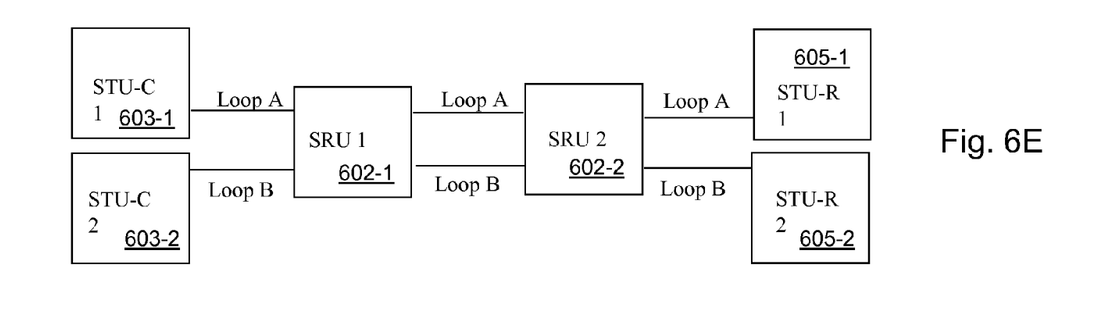

In particular, FIG. 6D is a block diagram of a topology having a single regenerator unit 602 coupled to two central units (603-1 and 603-2) and two remote units (605-1 and 605-2). Central unit 603-1 and remote unit 605-1 are coupled to regenerator unit 602 over loop A. Central unit 603-2 and remote unit 605-2 are coupled to regenerator unit 602 over loop B. Similarly, FIG. 6E is a block diagram of a topology having two regenerator units (602-1 and 602-2) coupled to two central units (603-1 and 603-2) and two remote units (605-1 and 605-2). Central unit 603-1 is coupled to regenerator unit 602-1 over loop A and remote unit 605-1 is coupled to regenerator unit 603-2 over loop A. Central unit 603-2 is coupled to regenerator unit 602-2 over loop B and remote unit 605-2 is coupled to regenerator unit 602-2 over loop B.

Figure 6F:
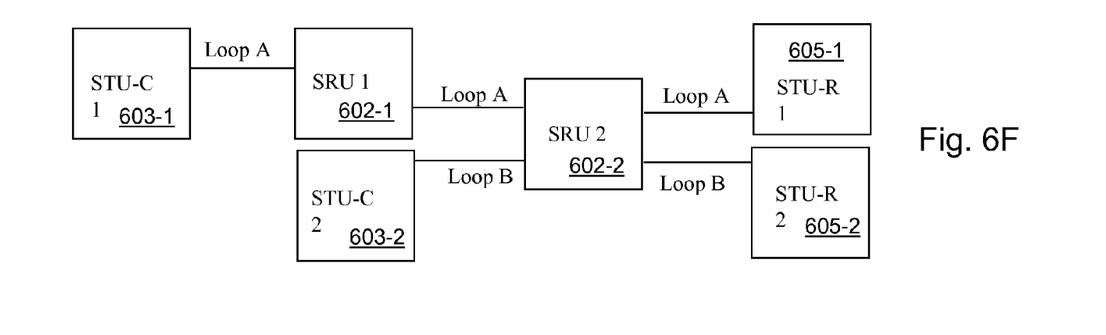

Another supported topology is shown in FIG. 6F. The topology in FIG. 6F has variable length spans for each of loop A and loop B. In other words, the span length of loop A from central unit 603-1 to remote unit 605-1 is different than the span length of loop B from central unit 603-2 to remote unit 605-2. In particular, central unit 603-1 is coupled to regenerator unit 602-1 over loop A. Regenerator unit 602-1 is then coupled to regenerator unit 602-2 over loop A which is in turn coupled to remote unit 605-1 over loop A. Central unit 603-2, however, is coupled directly to regenerator unit 602-2 over loop B which is in turn coupled to remote unit 605-2 over loop B. Each of the topologies in FIGS. 6D-6E are enables by the independent operation of each interface in regenerator units 602. The independent operation of each interface permits independent monitoring and alarms for each loop as well as separate auto-discovery of topology by more than one central unit as described above. Also, due to the independent operation of each interface, when a regenerator unit is inserted into any of the above exemplary configurations, the regenerator unit automatically becomes operational via EOC messaging without any additional configuration.

Figure 7:
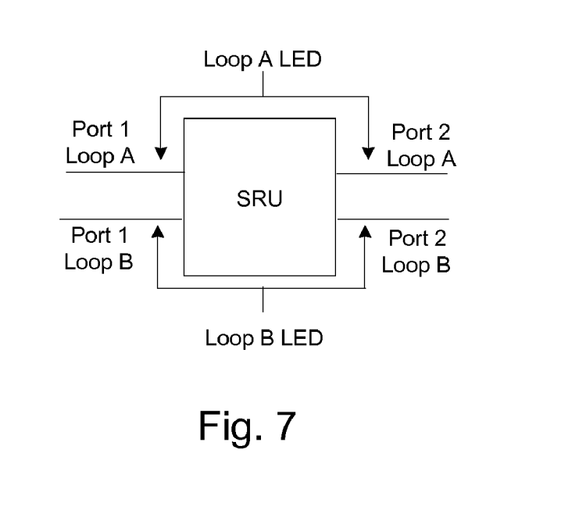
FIG. 7 is a block diagram of an one embodiment of a regenerator unit with LEDs.

To aid in troubleshooting regenerator units 602, in some embodiments, each regenerator unit 602 is equipped with two dual color light emitting diodes (LEDs). Each LED provides visual indications of alarms, loopbacks, and line status independent for one loop. Hence, there is one LED per loop. Also, in this embodiment, each LED provides three colors—red, green, and yellow. Yellow is obtained by illuminating both native colors. As can be seen in FIG. 7, the regenerator unit has 4 ports and two LEDs. The LEDs are assigned to the ports as shown in FIG. 7, one for each loop.

Figure 8:
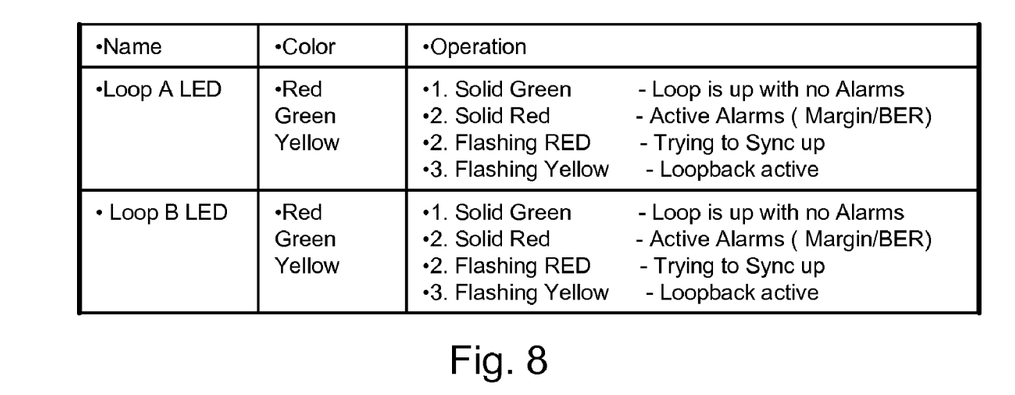
FIG. 8 is a table showing exemplary operation of LEDs in one embodiment of a regenerator unit.

FIG. 8 summarizes the LED function. Loop A LED displays solid Green when both Port 1 Loop A, and Port 2 Loop A reach the active state. Similarly, Loop B LED shall display solid Green when both Port 1 Loop B, and Port 2 Loop B reach the active state. If an error is detected on one of the loops, the corresponding LED displays solid Red. However, the other LED corresponding to the other loop will continue to display solid Green since each loop is independent of the other. Other LED displays include flashing red to indicate the interface is attempting to synchronize with another unit and flashing yellow to indicate the loopback status of the corresponding loop.

Figure 9:
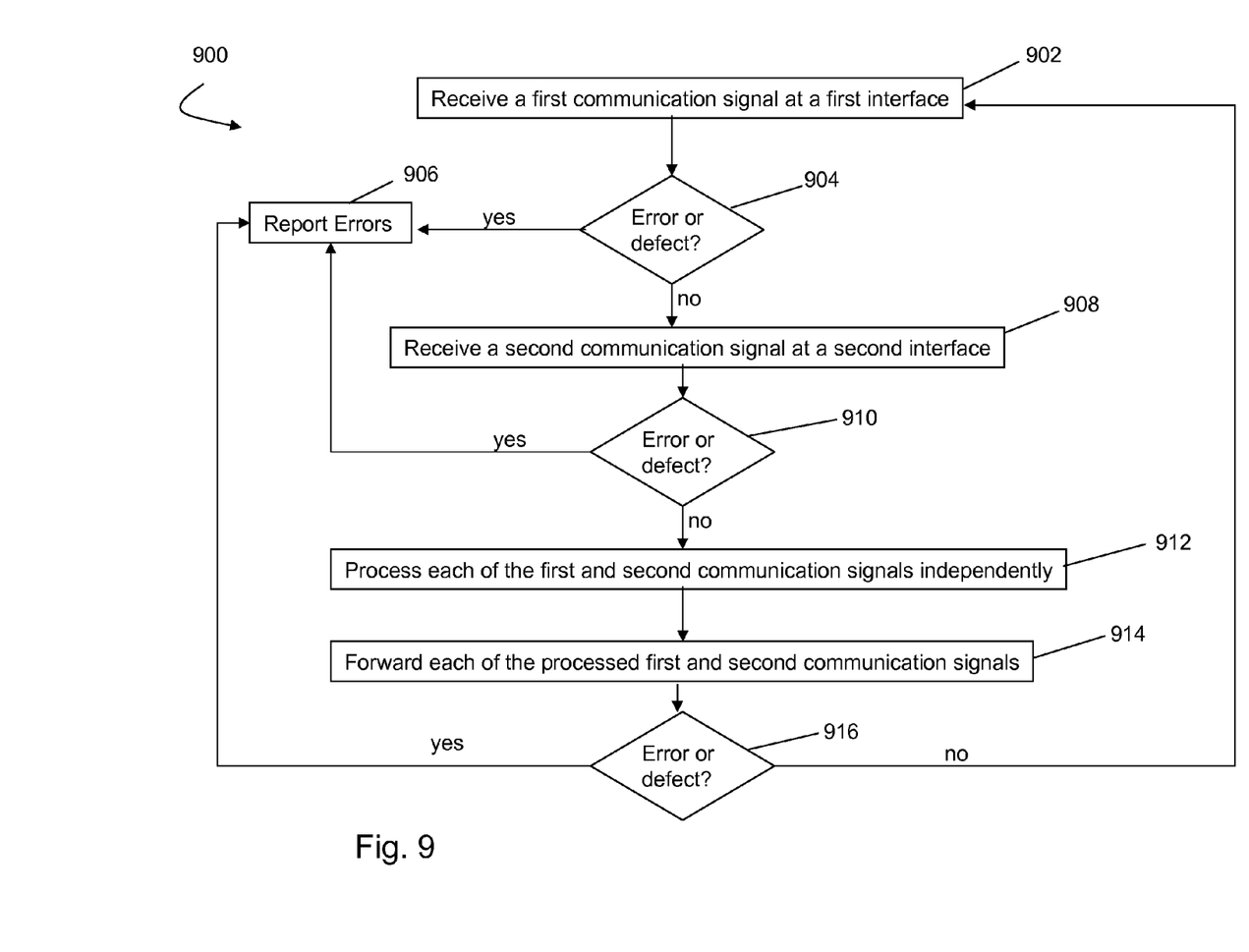
FIG. 9 is a flow chart depicting one embodiment of a method of extending communication lines.

FIG. 9 is a flow chart showing a method 900 of operating a regenerator unit according to one embodiment of the present invention. The regenerator unit, such as regenerator unit 102 described above, extends the length of communication lines. The length of a communication line is the length a communication signal travels from a central unit to a remote unit. At 902, a first communication signal is received at a first interface of a regenerator unit. At 904, the regenerator unit independently monitors the communication line or loop coupled to the first interface for errors or performance monitoring defects, as described above. If an error or performance monitoring defect is detected, the regenerator unit reports the error or defect at 906. In particular, the regenerator unit sets an alarm for the first interface's communication line independent of the operation of the second interface's communication line. For example, if an error is detected on the first interface, an alarm specific to the first interface is set and the second interface continues to operate without any change based on the alarm. In addition, in some embodiments, setting an alarm includes providing a visual indication of the alarm. In one example, an LED, such as the LEDs described above, are used to provide the visual indication. Each interface is associated with separate visual indicators, such as the LEDs described above.

At 908, a second communication signal is received at the second interface of the regenerator unit. At 910, the regenerator unit independently monitors the communication line or loop coupled to the second interface for errors or performance monitoring defects, as described above. If an error or performance monitoring defect is detected, the regenerator unit reports the error or defect at 906. In particular, the regenerator unit sets an alarm for the second interface's communication line independent of the operation of the first interface's communication line. For example, if an error is detected on the second interface, an alarm specific to the second interface is set and the first interface continues to operate without any change based on the alarm. In addition, in some embodiments, setting an alarm includes providing a visual indication of the alarm. In one example, an LED, such as the LEDs described above, are used to provide the visual indication. Each interface is associated with separate visual indicators, such as the LEDs described above.

At 912, if no error was detected on the first or second interface, each of the first and second communication signals are processed independently. In other words, each communication signal is processed without regard to the other communication signal. For example, in some systems, an identical EOC message is sent over both loops. A conventional regenerator unit receives a copy of the identical EOC message over each interface and selects one to process. However, in some embodiments, the regenerator unit processes each EOC message regardless of whether or not the content of each EOC message is identical. One method of processing EOC communication signals is described in more detail in FIG. 10.

At 914, the regenerator unit forwards each processed communication signal via the corresponding interface to the nearest neighbor on the communication line of the corresponding interface. At 916, the regenerator unit independently monitors the communication line or loop coupled to the corresponding interface for errors or performance monitoring defects, as described above. If an error or performance monitoring defect is detected, the regenerator unit reports the error or defect at 906 as described above. Method 900 then repeats at 902 for subsequent communication signals.

Figure 10:
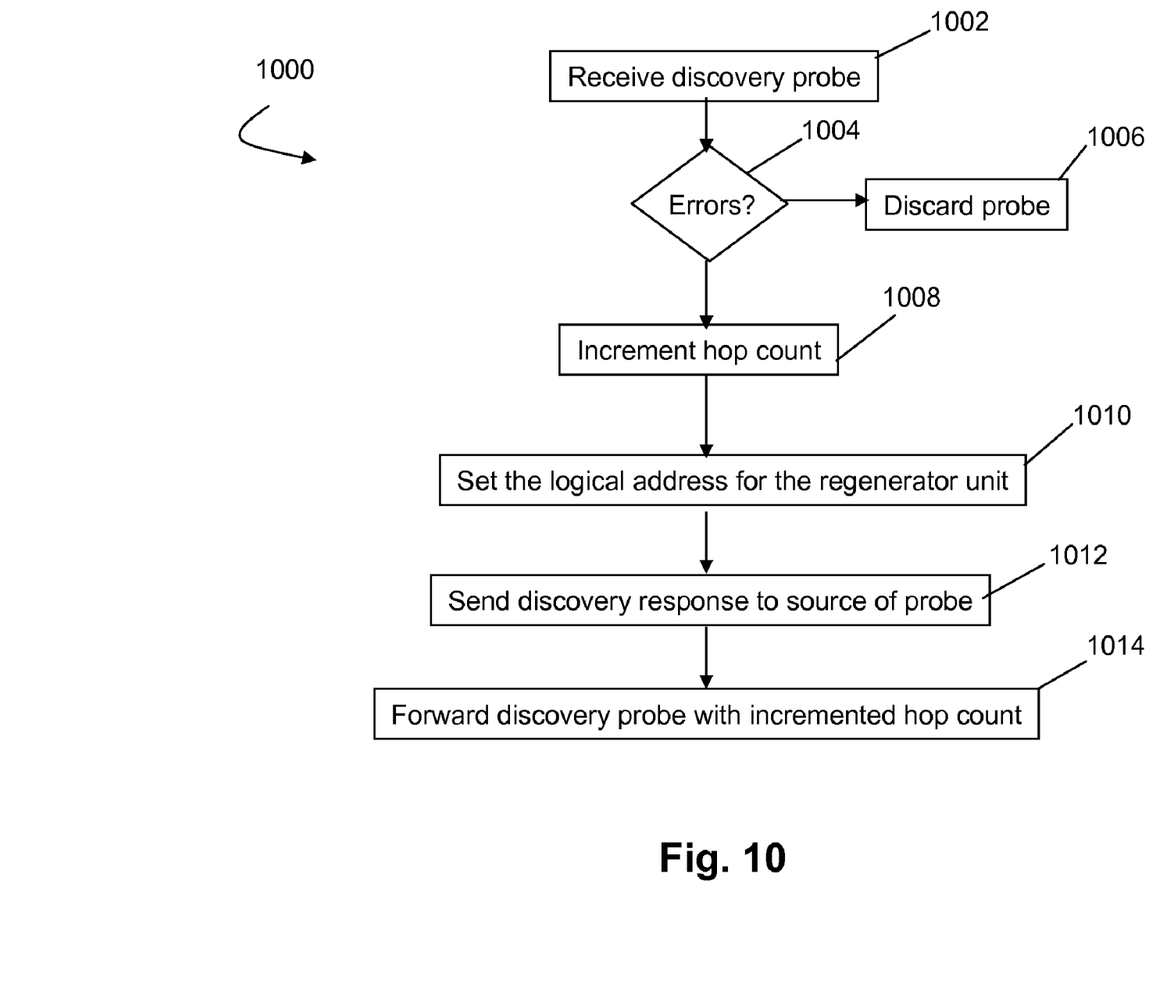
FIG. 10 is a flow chart showing one embodiment of a method of processing communication signals.

FIG. 10 is a flow chart showing one embodiment of a method of processing EOC communication signals for each interface of a regenerator unit. At 1002, the regenerator unit receives a discovery probe from a central unit or remote unit. As discussed above, each of the first and second interfaces is associated with a separate EOC. At 1004, the regenerator unit checks the discovery probe for errors. If errors are detected, the discovery probe is discarded at 1006. If no errors are detected, the regenerator unit increments the value of the hop count field, at 1008. At 1010, the regenerator unit allocates an EOC logical device address to the EOC state machine for the loop and side on which the discovery probe is received based on the discovery probe. In particular, the logical device address is based in part on the value of the hop count field in the discovery probe.

The hop count indicates the number of segments through which the discovery probe has passed. The hop count starts at zero at the source of the discovery probe (e.g. central unit or remote unit). The hop count is incremented each time the discovery probe traverses a segment. The current value of the hop count is used to allocate the unique logical device address. In this embodiment, the logical device address is set to be the hop count value plus 2. As can be seen in FIGS. 6D and 6E, the hop count, in some topologies, is the same for each loop. However, the device addresses are still unique for the loop. However, in other topologies, such as in FIG. 6F, some embodiments assign different device addresses on the same side of the regenerator unit.

At 1012, the regenerator unit sends a discovery response to the source of the discovery probe. At 1014, the regenerator unit forwards the discovery probe with the new incremented hop count value to an adjacent unit. EOC messaging using the allocated device address is able to obtain loop alarms for both sides corresponding to the loop independently of the other loop. Thus, when an EOC state machine goes offline because of error, it doesn't affect the other state machines, which remain active and maintain their assigned device address.

Figure 11:
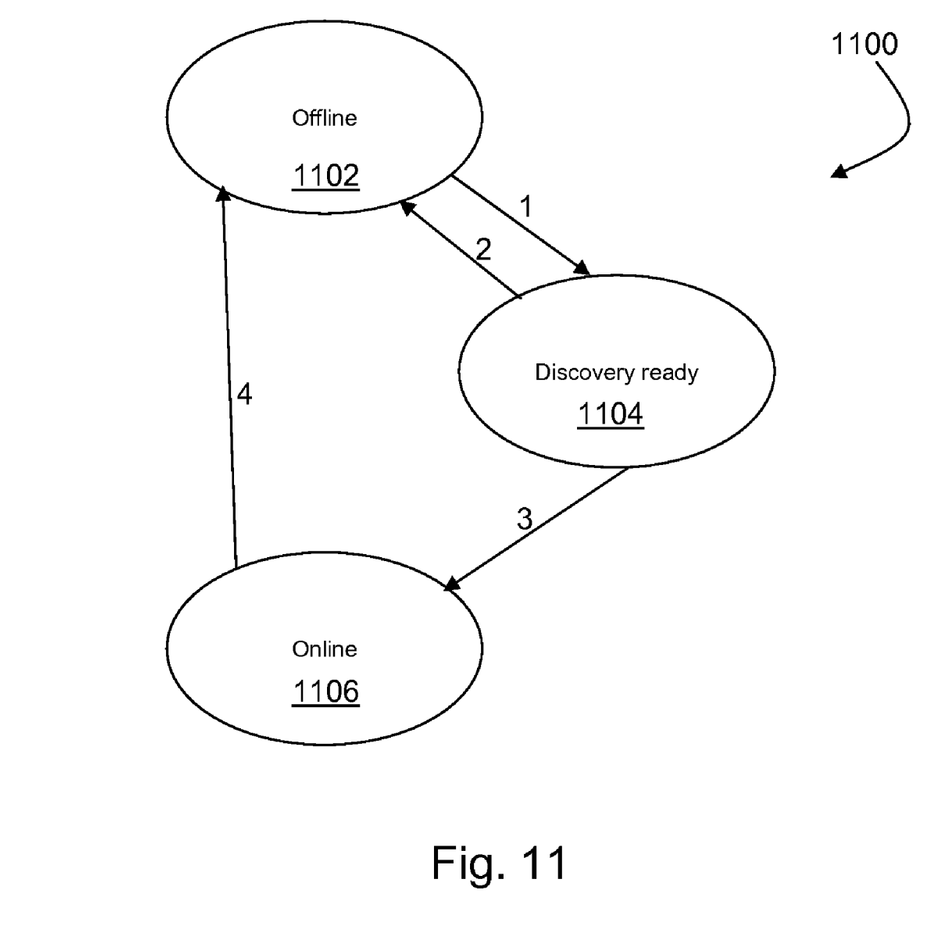
FIG. 11 is a state diagram of one embodiment of operation of a state machine.

FIG. 11 is a state diagram 1100 of the operation of an EOC state machine, such as state machine 116 above, according to some embodiments. The EOC state machine begins in the offline state 1102. For example, when the regenerator unit is unplugged or unconnected, the EOC state machine is in the offline state. When the line becomes active and no Loss of Sync Word (LOSW) error is detected, the unit switches to the discovery ready state 1104 as represented by arrow 1. For example, when the unit is plugged in or otherwise connected to another unit the line becomes active.

If an LOSW error is detected while in the discovery ready state, the state machine switches to the offline state 1102 as represented by arrow 2. When the state machine is in the discovery ready state 1104 and a discovery probe is received, the state machine switches to the online state 1106 as represented by arrow 3. When in the discovery ready state 1104, the state machine identifies a discovery probe by listening to a continuous byte stream of four EOC bytes until the start of frame byte is recognized and the discovery probe message is identified. In particular, when the line is active and the DSL frame is located, the EOC bytes in the frame are located and extracted by a framer as described above. The framer then passes the extracted EOC bytes in a continuous stream to a corresponding EOC processor. The corresponding EOC processor analyzes the EOC bytes received from the framer to determine the message type. Once a discovery probe is identified, a device address is allocated and the state machine switches to the online state 1106.

When in the online state 1106, if an LOSW error is detected, the state machine is switched to the offline state 1102 as represented by arrow 4. The cycle then repeats from the offline state 1102 as described above.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

We claim:

1. A communication system comprising:
    a central unit configured to transmit and receive communication signals;
    a remote unit configured to transmit and receive communication signals; and
    a regenerator unit configured to regenerate and transmit received communication signals, the regenerator unit comprising a first interface, a second interface and a control and status circuit configured to control operation of the first and second interface, wherein the first and second interfaces are configured to operate independently of each other as independent logical regenerator units;
    wherein the central unit and the remote unit communicate over a first communication loop via the first independent interface of the regenerator unit;
    wherein the regenerator unit is configured to set a first logical device address for a first side of the first interface, a second logical device address for a second side of the first interface, a third logical device address for a first side of the second interface, and a fourth logical device address for a second side of the second interface.

2. The communication system of claim 1, further comprising a second central unit configured to transmit and receive communication signals; and a second remote unit configured to transmit and receive communication signals; wherein the second central unit and the second remote unit communicate over a second communication loop via the second independent interface of the regenerator unit.

3. The communication system of claim 1, further comprising a second regenerator unit having a third interface and a fourth interface, each interface configured to operate as an independent logical regenerator unit; a second central unit; and a second remote unit, wherein the first central unit and the first remote unit communicate over the first communication loop via the first independent interface and the third independent interface; and wherein the second remote unit communicates with the second central unit over a second communication loop via the fourth independent interface.

4. The communication system of claim 1, wherein the regenerator unit is line powered from one of the central unit and the remote unit.

5. The communication system of claim 1, wherein the regenerator unit is configured to process embedded operations channel (EOC) messages received at the first interface independently from EOC messages received at the second interface.

6. The communication system of claim 1, wherein each interface of the regenerator unit comprises:
    two transceivers, each configured to transmit and receive communication signals;
    a framer configured to demodulate communication signals received via one of the two transceivers and to modulate the demodulated communication signals for transmission via the other transceiver; and
    a control and status circuit configured to control the modulation/demodulation of communication signals by the framer and to monitor alarm signals.

7. The communication system of claim 1, wherein the regenerator unit comprises more than two interfaces.

8. The communication system of claim 1, wherein each of the central unit, the remote unit, and the regenerator unit are configured to process communication signals according to the Global.standard High-Bit-Rate Digital Subscriber Line (G.SHDSL) standard.

9. The communication system of claim 1, wherein the control and status circuitry comprises two Embedded Operations Channel (EOC) state machines for each interface.

10. A regenerator unit comprising:
    a first interface configured to regenerate and transmit received communication signals, the first interface having a first logical device address for a first side of the first interface and a second logical device address for a second side of the first interface;
    a second interface configured to regenerate and transmit received communication signals, the second interface having a third logical device address for a first side of the second interface and a fourth logical device address for a second side of the second interface; and
    a control and status circuit configured to control the operation of each of the first and second interfaces;
    wherein the first and second interfaces are configured to operate independently of each other as independent logical regenerator units.

11. The regenerator unit of claim 10, wherein the regenerator unit is configured to operate on line power from one of a central unit and a remote unit.

12. The regenerator unit of claim 10, wherein the first interface is configured to process embedded operations channel (EOC) messages received at the first interface independently from EOC messages received at the second interface.

13. The regenerator unit of claim 10, wherein each of the first and second interfaces comprises:
    two transceivers, each configured to transmit and receive communication signals; and
    a framer configured to demodulate communication signals received via one of the two transceivers and to modulate the demodulated communication signals for transmission via the other transceiver.

14. The regenerator unit of claim 10, further comprising at least one additional interface.

15. The regenerator unit of claim 10, wherein each of the first and second interfaces are configured to process communication signals according to the Global.standard High-Bit-Rate Digital Subscriber Line (G.SHDSL) standard.

16. The regenerator unit of claim 10, wherein the control and status circuitry comprises two Embedded Operations Channel (EOC) state machines for each interface.

17. A method of operating a regenerator unit, the method comprising:
    receiving a first communication signal at a first interface of a regenerator unit;
    receiving a second communication signal at a second interface of the regenerator unit;
    processing each of the first and second communication signals independently of one another in the first and second interfaces, respectively; and
    forwarding each of the processed first and second communication signals via the first and second interfaces, respectively;

wherein processing each of the first and second communication signals comprises, for each of the first and second interfaces:

receiving a discovery probe;

determining if there are errors in the received discovery probe;

if there are no errors in the discovery probe, setting a logical device address for the interface and side on which the discovery probe was received; and sending a discovery response to the source of the discovery probe.

18. The method of claim 17 further comprising;

monitoring each interface's corresponding communication line for an error prior to processing the corresponding communication signal; and if an error is detected, setting an alarm specific to the corresponding communication line independent of the operation of the other communication line.

19. The method of claim 18, wherein setting an alarm specific to the corresponding communication line includes providing a visual indication of the alarm, the visual indication being specific to the corresponding communication interface.

20. The method of claim 17, wherein setting the logical device address comprises setting the logical device address based, at least in part, on a value in a hop count field of the discovery probe.

21. The method of claim 17, further comprising:

incrementing a hop count field in the discovery probe; and forwarding the discovery probe with the incremented hop count field.

* * * * *